United States Patent [19]

Bauer et al.

[11] Patent Number: 4,744,100
[45] Date of Patent: May 10, 1988

[54] X-RAY SHEET FILM CASSETTE

[75] Inventors: Walter Bauer, Munich; Manfred Schmidt, Kirchheim; Heinz Korsa, Munich, all of Fed. Rep. of Germany

[73] Assignee: Agfa-Gevaert AG, Leverkusen, Fed. Rep. of Germany

[21] Appl. No.: 884,287

[22] Filed: Jul. 10, 1986

[30] Foreign Application Priority Data

Aug. 1, 1985 [DE] Fed. Rep. of Germany ....... 3527549

[51] Int. Cl.⁴ ............................................. G03B 42/04
[52] U.S. Cl. .................................... 378/187; 378/165; 378/188
[58] Field of Search ............... 378/188, 182, 187, 185, 378/165

[56] References Cited

U.S. PATENT DOCUMENTS 4,352,198 9/1982 Fukushima ........................... 378/188
4,434,501 2/1984 Pfeiffer ................................. 378/187
4,613,984 9/1986 Fisher .................................... 378/185

FOREIGN PATENT DOCUMENTS 8400985 4/1984 Fed. Rep. of Germany .

Primary Examiner—Craig E. Church
Assistant Examiner—T. N. Grigsby
Attorney, Agent, or Firm—Michael J. Striker

[57] ABSTRACT

An x-ray film sheet cassette, comprises a bottom part, and a cover part which are turnable relative to one another and lockable with one another, an element forming a guiding surface in the bottom part for guiding a film sheet during its insertion into the cassette between the bottom part and the cover part, a suction cup arranged in the bottom part for attracting a film sheet and having an upper edge, and a spring element arranged in the bottom part and formed so that when the cover part is open, the spring element lifts the guiding surface above a level of the upper edge of the suction cup, and when the cover is closed it presses the guiding surface and the spring element downwardly so that the suction cup is brought into contact with a film sheet.

14 Claims, 2 Drawing Sheets

F I G. 1
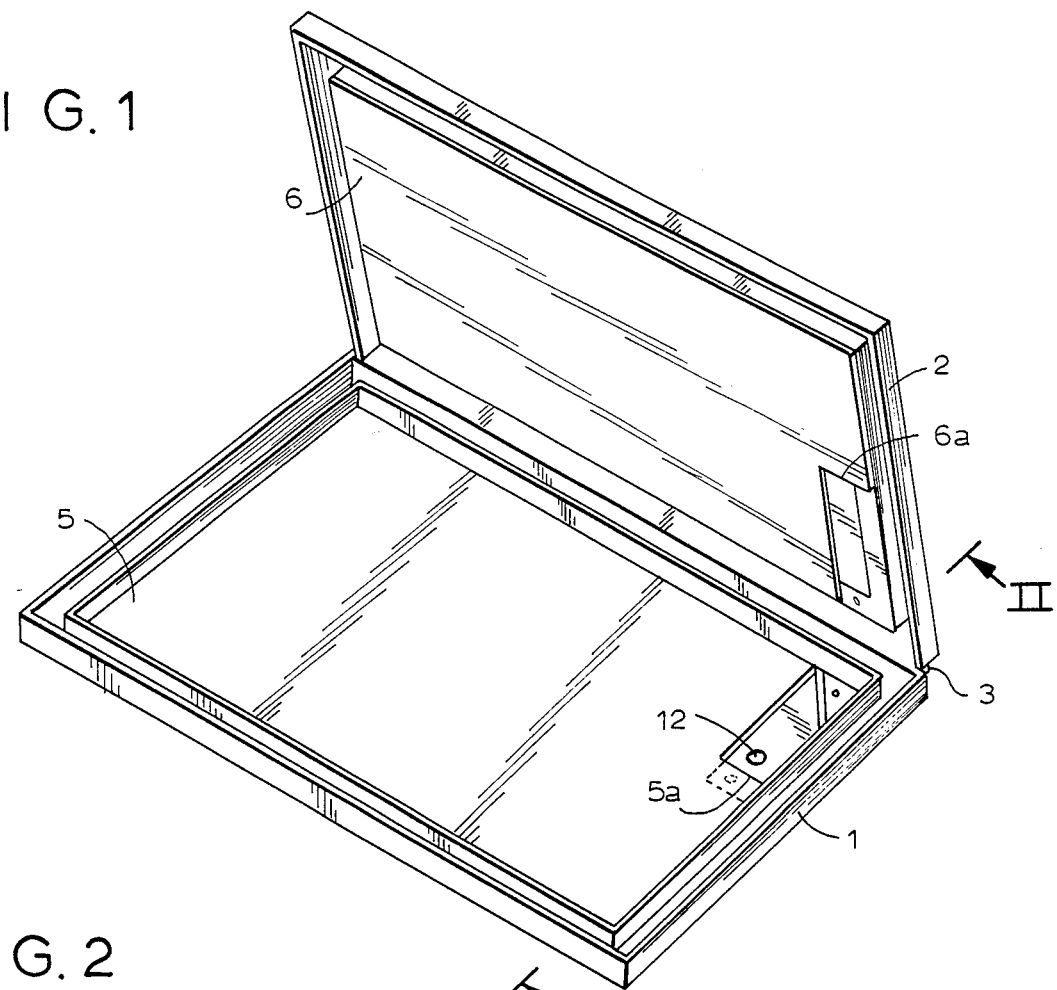
F I G. 2
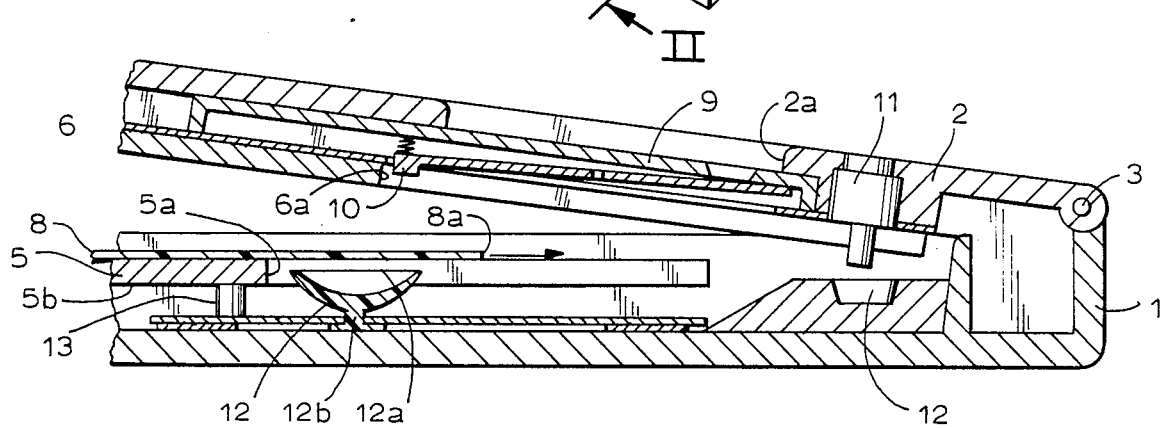
F I G. 3
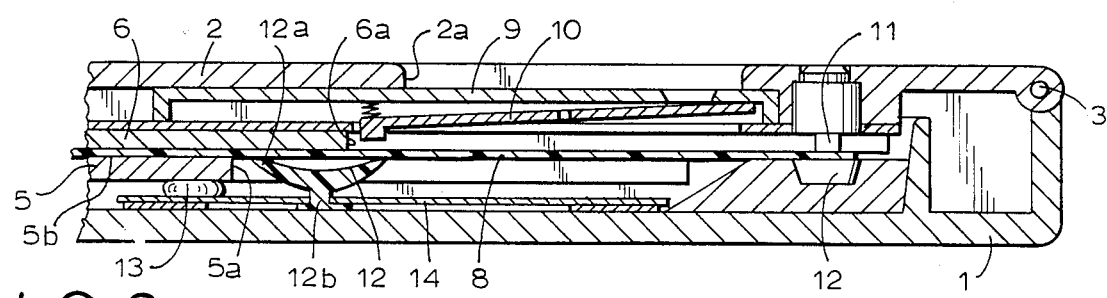

X-RAY SHEET FILM CASSETTE

BACKGROUND OF THE INVENTION

The present invention relates to an X-ray sheet film cassette. More particularly, it relates to such a cassette which has a bottom part and a cover part. A pressing element is composed for example of a foam material, a counter foil or a magnetic foil is arranged in the cover part, while a reinforcing foil and/or magnetic foil or counter foil is arranged in the bottom part. The foil located in the bottom has a cutout, and a suction cup is arranged in the bottom part at the location of the cutout so as to hold the film in the bottom part during opening of the cover part. The cassettes of the above mentioned general type are known in the art. One of such cassettes is disclosed, for example, in the German document DE-GMS No. 8,400,985. In this known cassette a new film sheet which is to be inserted comes in contact with the suction cup and remains hanging on it before it assumes its predetermined position in the cassette. It is believed that this is a disadvantage in the operation of the cassette.

SUMMARY OF THE INVENTION

Accordingly, it is an object of the present invention to provide an X-ray sheet film cassette which avoids the disadvantages of the prior art.

More particularly, it is an object of the present invention to provide an x-ray sheet film cassette in which orderly loading of the cassette is not hindered by the suction cup for holding a film sheet during opening of the cassette.

In keeping with these objects and with others which will become apparent hereinafter, one feature of the present invention resides, briefly stated, in a cassette in which a spring element which lifts a guiding surface for a front edge of a film sheet to be inserted is in combination with a suction cup, the film sheet is deflectable by the lifted guiding surface over the level of the suction cup upper edge, and the guiding surface and the spring element are pressed downwardly by means of the pressing element located at the cover side in the closed cassette and inserted film sheet, so that the suction cup is brought into contact with the film sheet.

When the cassette is designed in accordance with the above explained features, it avoids the disadvantages of the prior art and provides for the above specified advantageous results.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of an open unloaded x-ray film cassette in accordance with the present invention;

FIG. 2 is a view showing a section of the cassette of FIG. 1, taken along the line II—II of FIG. 1;

FIG. 3 is a view showing a section corresponding to that of FIG. 2, but with the closed cassette;

DESCRIPTION OF THE PREFERRED EMBODIMENTS

Figure 4:
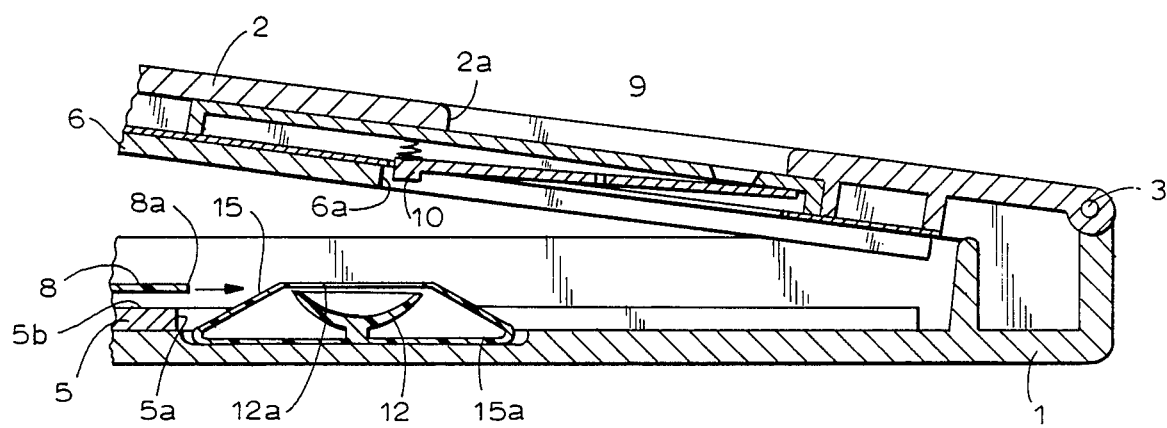
FIG. 4 is a view showing a section corresponding to that of FIG. 2, but illustrating another embodiment of the cassette of the present invention.

An x-ray sheet film cassette in accordance with the present invention has a body part 1 and a cover part 2 which is connected with the body part by a hinge 3. A not shown locking element is located between the body part and the cover part at their end which is opposite to the hinge. A reinforcing foil 5 is provided in the bottom part 1, and the reinforcing foil 6 is provided in the cover part 2.

For applying pressure to the film, a foam material plate or also a magnetic foil can be arranged in one part of the cassette, and a counterfoil can be arranged in the other part of the cassette and formed, for example, as a vacuum pressing device. Such a device is known in the art and therefore is not shown in the drawing. In the above described cassette which is known per se, it often happens that an inserted film sheet 8 remains adhered to the reinforcing foil 6 arranged in the cover, and thereby is pulled upwardly together with the latter. As a result of this, the sheet film 8 can be incorrectly engaged by the suction elements in the cassette unloading station and can be damaged or destroyed in addition to a disturbance which thereby can take place in the unloading device.

For counteracting this adherence of the sheet film 8 to the cover 2 or more particularly to the reinforcing foil 6 so as to pull the film sheet back to the bottom part and therefore to provide a possibility to remove the film sheet by suction elements from the fully opened cassette, the reinforcing foil 5 arranged in the bottom part is cut out and an adherent element is provided at this location in the inner bottom surface. During insertion of the film 8 into the cassette between its parts 1 and 2 and closing of the cassette, the film sheet 8 is pressed against the adherent element and easily adheres to the latter. When the cover 2 is opened and the film remains somewhat suspended on the cover side, the adherence action of the adherent element is stronger than the adherence to the cover 2. Thereby the film sheet 8 is pulled from the reinforcing foil 6 back to the bottom part 1 so that when the suction element of an unloading device is brought, the film sheet is located in a proper position for removal. This known design leads, however, to the fact that the front edges of the newly inserted film sheet remain suspended on the suction cup, or the film sheet comes to abutment against the suction cup and therefore cannot move into the cassette through the above described position. This disadvantage is eliminated by the novel features provided in the cassette of the present invention. Since the invention features has nothing to do with the remaining elements of the cassette, the latter are not shown or described in detail. For example, an illuminating window with an outwardly openable cover slider in the cover 2 are identified as a whole with reference numerals 2a, 9 and 10. Under these parts, the cover foils which are not shown individually, are just identified as the reinforcing foil 6 which is provided with a cutout 6a. The bottom foils are identified by the reinforcing foil 5 which has a somewhat offset cutout 5a. Known film indicators 11 and 12 can be provided in the outermost film edge region.

A suction cup 12 is arranged in the region of the bottom foil cutout 5a which is offset relative to the cover foil cutout 2a, 6a. The suction cup 12 has a suction face and an upper edge 12a which face upwardly toward the film 8. The suction cup 12 is spaced as far as possible in the periphery of the cutout size from the cassette size which is closed to the window 8. The utilization of the region of the data illuminating window 2a, 6a, 5a, for bringing the suction cup 12, has the advantage that no additional film surface for the adherent element formed by the suction cup is lost. Basically it would also be possible to provide in another suitable location in the bottom foil 5 a cutout for mounting of the suction cup 12. Also several suction cups can be provided.

The suction cup 12 in accordance with the invention as shown in FIGS. 1–3 is in combination with a spring element 13 which can be formed for example as a rubber or as a synthetic plastic plug. The spring element 13 is located under the bottom part foil 5 and presses the latter, in the case of the opened cassette 1, 2 and the removed film 8 so far upwardly that the edge 5a of the cutout in the foil 5 lies above the upper edge 12a of the suction cup 12. Therefore, an upper edge 5b of the foil 5 serves as a guiding surface for deflecting a newly insertable film sheet 8 above the suction cup 12. As a result of this, the film sheet 8 does not come into contact with the suction cup 12 and can be orderly transported into the cassette, as can be seen from FIG. 2.

During the subsequent closing of the cassette illustrated in FIG. 3, the pressing element which is not shown in detail and provided in the cover 2 or in the cover 1 and the cover 2, presses against the bottom part 1 so that the spring element 13 is compressed. The upper surface 5b of the reinforcing foil 5 displaces in or below the plane of the upper edge 12a of the suction cup 12, so that the suction cup 12 is firmly sucked against the lower side of the film and retains the film 8 during opening of the cover 12. As a result of this, during opening of the cover 2 the film 8 does not remain adhered on the cover reinforcing foil 6, and retains its position until its removal by a suction element of the unloading device.

In the cassette in accordance with the embodiment of FIGS. 1–3, the spring element which is formed as the elastic plug 13 is of one-piece with a foil piece 14. The lower side of the suction cup 12 is formed as a pedestal 12b and extends through a small opening in the foil piece 14. The foil piece 14 lies between the bottom of the cassette and the bottom foil 5 so that the suction cup 12 lies in the cutout 5a and the spring element 13 lies under the bottom foil 5. It is also possible that the spring element 13 is mounted on the foil piece 14 by means of a pedestal connection similar to the suction cup connection. On the other hand, the spring element 13 can be formed on the foil piece 14 similarly to the suction cup 12. The spring element 13 can also be formed as a small air bellows.

Figure 5:
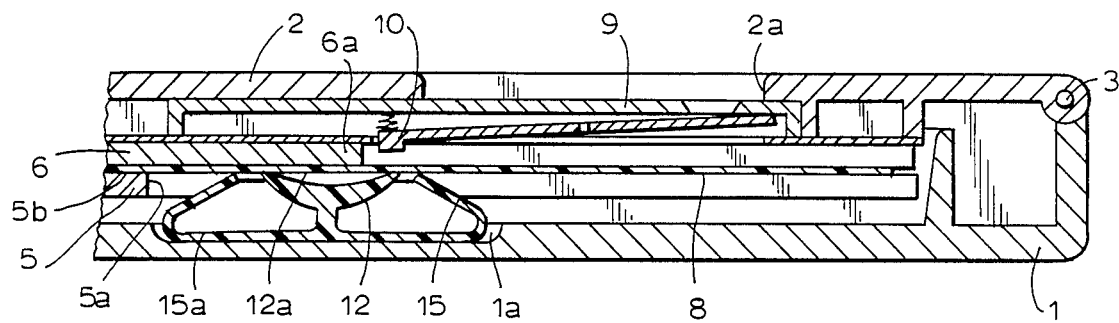
FIG. 5 is a view showing a section of the cassette corresponding to that of FIG. 4, but with the closed cassette.

In the cassette in accordance with the embodiment of FIG. 4 and 5, the guiding surface, the spring element, and the suction cup are formed of one-piece with one another. The guiding surface is formed by a cone 15 which is provided on the upper edge 12a of the suction cup and widens downwardly. The cone 15 and the suction cup 12 have a common closed bottom surface 15a. Thereby the suction cup 12 and the cone 15 together form a spring element which is located in the cutout 5a and in open unloaded condition of the cassette projects upwardly as can be seen in FIG. 4.

When a new film sheet 8 is introduced, the front edge 8a of the film sheet is lifted on the surface of the cone 15 so that it travels above the suction 12 and the film insertion is not hindered by the suction cup. During closing of the loaded cassette, the pressing element in the cover 2 or the counterplate in the cover which is attracted by a bottom bottom plate, presses via the reinforcing foil 6 the film sheet 8 against the suction cup 12 and its upper edge 12a downwardly to the plane of the upper surface of the bottom reinforcing foil 5. In this embodiment the cutout 6a is also smaller than the cutout 5a, so that the foil or foils 6 extend over the suction cup 12. For fixing the suction cup-guiding element-spring element unit 12, 15, in the bottom part 1 it is advantageous to place it in a small trough 1a in the bottom part 1.

It will be understood that each of the elements described above, or two or more together, may also find a useful application in other types of constructions differing from the types described above.

While the invention has been illustrated and described as embodied in an x-ray film sheet cassette, it is not intended to be limited to the details shown, since various modifications and structural changes may be made without departing in any way from the spirit of the preset invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letterst Patent is set forth in the appended claims.

1. An X-ray film cassette, comprising a bottom part and a cover part which are turnable relative to one another and lockable with one another; a suction cup in the bottom part of said cassette, said suction cup having a concave surface and a convex surface, said concave surface facing said cover part, said suction cup being integral or contiguous with an adjoining pedestal, said pedestal being attached to said bottom part; means for guiding a film sheet, during its insertion into said cassette, between said bottom part and said cover part and above a common upper edge of said concave and convex surfaces such that, when a new film sheet is being inserted into the cassette, the film sheet travels above and is unhindered by said suction cup, said means for guiding comprising a guiding surface; spring element means for lifting said guiding surface above said common upper edge while the film sheet is being inserted, said spring element means being compressible in the direction normal to the major surface of said bottom part such that when the cover is closed it presses said new film sheet downwardly against said guiding surface, compressing said spring element means and bringing the new film sheet into engagement with said suction cup such that, during opening of the cassette, the film sheet is retained in said bottom part by said suction cup and does not adhere to and move with said cover part.

2. A cassette as defined in claim 1, wherein a first foil arranged in said bottom part has an upper surface which forms said guiding surface, said spring element being located under said first foil and when said cover is open lifts said first foil so that its upper surface is located above the level of said upper edge of said suction cup.

3. A cassette as defined in claim 2; and further comprising a piece of second foil located under said first foil, said suction cup and said spring element being arranged on said piece of second foil, said first foil having a cutout, and said suction cup being located in said cutout of said first foil while said spring element is located under said first foil.

4. A cassette as defined in claim 3, wherein said suction cup and said spring element each form a member having a portion, said piece of second foil having a through opening, said portion of at least one of said members extending through said through opening of said piece of second foil.

5. A cassette as defined in claim 4, wherein said suction cup has a lower side which is formed as said pedestal and forms said portion which extends through said through opening of said piece of second foil.

6. A cassette as defined in claim 1, wherein said spring element is formed as a plug.

7. A cassette as defined in claim 6, wherein said spring element is formed as a rubber plug.

8. A cassette as defined in claim 6, wherein said spring element is formed as a synthetic plastic plug.

9. A cassette as defined in claim 1; and further comprising a springy flat part which raises conically towards said upper edge of said suction cup and simultaneously forms said spring element means and said guiding surface.

10. A cassette as defined in claim 9, wherein said bottom part has a trough, said springy flat part being arranged in said trough of said bottom part.

11. A cassette as defined in claim 9, wherein said springy flat part is formed of one-piece with said suction cup.

12. A cassette as defined in claim 11; and further comprising a first foil arranged in said bottom part and having an upper surface, said flat part being provided with an inner chamber which allows its springing such that when said cover is open and the cassette is not loaded, said springy flat part extends upwardly above said upper surface of said first foil.

13. A cassette as defined in claim 1; and further comprising means forming a data illuminating window having an edge, said suction cup being located near said edge of said window.

14. A cassette as defined in claim 13, wherein said cover part and said bottom part have a side which is closer to said window, said window having one end which is closer to said side and another end which is farther from said side, said suction cup being arranged at the other farther end of said window.

* * * * *